United States Patent
Nitsche

(10) Patent No.: US 11,731,194 B2
(45) Date of Patent: Aug. 22, 2023

(54) DEVICE FOR CASTING ELECTRODE SUPPORTS FOR LEAD-ACID BATTERIES

(71) Applicant: IQ POWER LICENSING AG, Zug (CH)

(72) Inventor: Werner Nitsche, Lippstadt (DE)

( * ) Notice: Subject to any disclaimer, the term of this patent is extended or adjusted under 35 U.S.C. 154(b) by 0 days.

(21) Appl. No.: 17/408,026

(22) Filed: Aug. 20, 2021

(65) Prior Publication Data
US 2021/0379653 A1 Dec. 9, 2021

Related U.S. Application Data

(63) Continuation of application No. 16/526,770, filed on Jul. 30, 2019, now abandoned, which is a (Continued)

(30) Foreign Application Priority Data

May 19, 2017 (DE) ...................... 10 2017 004 815.0

(51) Int. Cl.
*B22D 25/04* (2006.01)
*B22D 11/00* (2006.01)
(Continued)

(52) U.S. Cl.
CPC ............ *B22D 25/04* (2013.01); *B22D 11/001* (2013.01); *B22D 11/0602* (2013.01);
(Continued)

(58) Field of Classification Search
CPC ....... B22D 11/00; B22D 11/001; B22D 11/06; B22D 11/0602; B22D 11/0611;
(Continued)

(56) References Cited

U.S. PATENT DOCUMENTS 3,587,717 A * 6/1971 Yamauchi et al. .......................... B22D 11/0634
164/452
3,659,643 A 5/1972 Pauels
(Continued)

FOREIGN PATENT DOCUMENTS

CN 202779655 3/2013
CN 204643301 U 9/2015
(Continued)

OTHER PUBLICATIONS

English translation of the international search report and written opinion of the PCT/DE2018/000152 dated Dec. 13, 2018; 8 pages.
(Continued)

*Primary Examiner* — Kevin P Kerns
(74) *Attorney, Agent, or Firm* — Squire Patton Boggs (US) LLP

(57) ABSTRACT

A device for casting electrode carriers for the production of lead grid electrodes in a continuous casting process is provided, which includes a casting drum, the surface of which has been engraved with the shape of the lead strip to be cast, and a casting shoe which rests on the outer circumference of the casting drum in the region of the horizontal axis drawn through the axis of rotation when the casting drum rotates counterclockwise, whereat the exiting liquid lead flows into the concave mold of the casting drum surface and is removable as a solidified lead strip at the lower vertex of the casting drum after three quarters of a rotation and whereat draft angles of less than 7 degrees, in particular less than 3 degrees are provided.

2 Claims, 1 Drawing Sheet

Related U.S. Application Data continuation of application No. PCT/DE2018/000152, filed on May 22, 2018.

(51) Int. Cl.
*B22D 11/06* (2006.01)
*H01M 4/84* (2006.01)

(52) U.S. Cl.
CPC ...... *B22D 11/0611* (2013.01); *B22D 11/0634* (2013.01); *H01M 4/84* (2013.01)

(58) Field of Classification Search
CPC  B22D 11/0634; B22D 11/0651; B22D 25/04; H01M 4/84
USPC ..................................... 164/160.1, 429, 479
See application file for complete search history.

(56) References Cited

U.S. PATENT DOCUMENTS

| | | |
|---|---|---|
| 3,926,247 A | 12/1975 | Geiger et al. |
| 4,069,860 A * | 1/1978 | Ward ................ B22D 11/0668 164/268 |
| 4,349,067 A | 9/1982 | Wirtz et al. |
| 4,456,579 A | 6/1984 | Rao et al. |
| 4,489,772 A | 12/1984 | McLane et al. |
| 4,543,404 A | 9/1985 | Sugano et al. |
| 4,544,014 A | 10/1985 | McLane et al. |
| 4,545,422 A | 10/1985 | McLane et al. |
| 4,617,981 A | 10/1986 | Maringer |
| 4,658,885 A | 4/1987 | Maringer |
| 4,805,277 A | 2/1989 | Yasuda et al. |
| 4,819,712 A | 4/1989 | Bartlett |
| 4,906,540 A | 3/1990 | Hoshihara et al. |
| 5,251,687 A | 10/1993 | Ashok et al. |
| 5,462,109 A | 10/1995 | Vincze et al. |
| 5,497,822 A | 3/1996 | Schenk |
| 5,590,702 A | 1/1997 | Schenk |
| 5,611,128 A | 3/1997 | Wirtz |
| 5,762,654 A | 6/1998 | Kump et al. |
| 5,954,117 A | 9/1999 | Godinho |
| 6,386,267 B1 | 5/2002 | Kagan |
| 6,584,669 B1 | 7/2003 | Gourdet et al. |
| 6,895,644 B2 | 5/2005 | Wirtz |
| 7,398,581 B2 | 7/2008 | Chen |
| 7,874,346 B2 | 1/2011 | Maeda et al. |
| 8,322,399 B2 | 12/2012 | Farina |
| 8,875,361 B2 | 11/2014 | Wirtz et al. |
| 8,915,291 B2 | 12/2014 | Farina |
| 9,421,607 B2 | 8/2016 | Rossi et al. |

FOREIGN PATENT DOCUMENTS

| | | |
|---|---|---|
| DE | 7825546 U | 11/1979 |
| DE | 222511 A1 | 5/1985 |
| DE | 69413310 T2 | 3/1999 |
| JP | S 46-23823 B | 8/1971 |
| JP | 58-181454 A | 10/1983 |
| JP | S 61-235046 A | 10/1983 |
| JP | 06-190514 A | 7/1994 |
| JP | 07-001092 A | 1/1995 |
| JP | H 11-003714 A | 1/1999 |
| JP | 2001-266895 A | 9/2001 |
| JP | 2001-273918 A | 10/2001 |
| JP | 2002-075379 A | 3/2002 |
| WO | WO 87/02285 A1 | 4/1987 |
| WO | WO 94/07629 A1 | 4/1994 |

OTHER PUBLICATIONS

Notice of Reasons for Refusal of Japanese Patent Application No. 2020-514322 dated Apr. 8, 2022.
English translation of the 2nd Office Action of CN Application No. 201880033022.4 dated Feb. 18, 2022.

\* cited by examiner

DEVICE FOR CASTING ELECTRODE SUPPORTS FOR LEAD-ACID BATTERIES

CROSS-REFERENCE

This application is a continuation of U.S. application Ser. No. 16/526,770, filed 30 Jul. 2019(now abandoned), which is a continuation of PCT/DE2018/000152, filed 22 May 2018, which claims priority to application number 10 2017 004 815.0 (DE), filed 19 May 2017 (now abandoned), which are incorporated herein by reference in their entirety.

FIELD AND BACKGROUND

The following techniques are used in the manufacture of electrode carriers, hereafter denoted as grids, of positive and negative electrodes in lead-acid batteries: gravity casting or injection-mold casting technique, expanded metal technique, punching technique and continuous casting by means of a casting drum.

Gravity Casting and Injection Mold Casting Technique:

In the case of drop casting or injection mold casting technique, molds consisting of two half molds are filled with liquid lead, and the mold is removed by opening up the mold halves after the lead has solidified. The two mold halves receive a cork finish to prevent the lead from solidifying while the mold is being filled as well as to absorb the displaced air. One advantage of this method is the diamond-shaped structure of the grid and the roughness of the surface. Both result in a good mass to grid adhesion. Furthermore, the roughness increases the contact surface. Disadvantages are decreased productivity and the limitations with regards to the choice of alloy. Soft alloys and thus more corrosion-resistant alloys cannot be processed with this technique. Furthermore, the handling requirements result in limitations with regards to the grid thickness and hence the weight. The limitation of the minimum grid weights is a very significant cost disadvantage of the gravity casting process. Since all alloying constituents are connected with disadvantages relating to corrosion and grid size, e.g. Ca-alloys, or water consumption, e.g. Sb-alloys, the drop casting process is not suitable for the soft lead alloys that will be required in the future. The demands for significantly increased cycle resistance and service life require corrosion resistant soft lead alloys.

Expanded Metal and Punching Technique: In the extended metal as well as the punching technique, a lead strip is cast to begin and possibly rolled in order to increase the mechanical stability on the one hand and obtain a fine-grained, more corrosion-resistant structure on the other hand specifical for use as positive electrodes. Both methods feature much higher productivity compared to the drop casting technique. With both techniques, the current deflectors, commonly referred to as lugs, can only exhibit the thickness of the lead strip. This restricts the electrical resistance.

During the stretching process in expanded metal, the grid bars are twisted, resulting in good adhesion properties of the electrodes active material. The main drawbacks of the expanded metal technique are the lack of a closed frame and a limitation to hard alloys resulting from the lack of a closed frame. The missing frame along with the hard alloys inevitably introduce a problem of possible damage to the separator between polarities. Expanded metal electrode grids are especially problematic in AGM (Absorbent Glass Mat) batteries.

With the punching technique, one can use any closed-frame grid geometry and any alloy. Nevertheless, the punching technique has a very significant disadvantage in addition to its high initial investment costs. During the punching process about 75%-85% of the lead is punched out. These punched parts have a lead oxide surface. Without elaborate refinement, that is during immediate return to the lead smelting boiler, the lead oxide makes its way into the grid and leads to increased corrosion. Although it is possible to process any lead alloys, the system speed must be considerably reduced for soft alloys.

Continuous Casting by Means of a Casting Drum:

In the case of continuous casting of lead electrodes with the aid of a casting drum featuring an engraved grid structure and a casting shoe with which the liquid lead is fed into the lattice structure, the casting speed is independent of the alloy composition, so that even soft lead can be processed productively. Furthermore, the current deflector, the lug, can be made thicker than the grid and the frame or grid bars can be made stronger than the remaining inner bars. However, the continuous casting techniques that is currently available has a serious disadvantage with respect to positive electrodes.

In order to remove the grid belt from the drum, prior art systems necessitate a draft angle in the grid engraving that is greater than 10 degrees. The draft angle requires an overpaste on the shoe side in order to avoid a slipping out of the grid, analogous to a dovetail. The trapezoidal cross-sectional area is also unfavorable in terms of corrosion, as corrosion is determined by the location of the smallest cross-section. Thus, more lead is needed than with a square cross section. The most significant disadvantage, however, is the asymmetry of the grid and the plate, which results in curvature of positive electrodes during the charging/discharging process, which are due to different volumes in the charged/discharged states, whereby the active mass is separated from the grid and considerable pressure is exerted to the separator. For this reason, continuously cast grids are not used for positive electrodes for the time being.

SUMMARY

Device for casting electrode grids for the production of lead acid batteries in a continuous casting process, wherein the device features the following:

a casting drum, the surface of which has been engraved with the shape of the lead strip (3) to be cast, and a casting shoe which rests on the outer circumference of the casting drum in the region of the horizontal axis drawn through the axis of rotation when the casting drum rotates counterclockwise, wherein the exiting liquid lead flows into the concave mold of the casting drum surface and is removable as a solidified lead strip at the lower vertex of the casting drum after three quarters of a rotation, wherein draft angles of less than 7 degrees, in particular less than 3 degrees, is provided.

A device for casting electrode carriers for the production of lead grid electrodes in a continuous casting process, is provided comprising:

(a) a casting drum having a draft angle of less than 7 degrees, the surface of which has been engraved with the shape of a lead grid strip to be cast, and (b) a casting shoe positioned on the outer circumference of the casting drum, wherein during rotation of the casting drum an exiting liquid lead flows into a concave mold of the casting drum surface and is removable as a solidified lead grid strip at a lower vertex of the casting drum after less than one turn of a rotation of the casting drum, and wherein after about a three quarter counterclockwise turn of the casting drum, the lead grid strip is withdrawable at a lower vertex only by mean of the force of gravity acting perpendicular on the lead grid strip and releasing the lead grid strip from the casting durm having the draft draft angles of less than 7 degrees.

In some embodiments, a vacuum device is provided for removing the lead strip; a blowing device is provided for removing the lead strip, which blows compressed air between a cast grid belt and the cast drum engraving; a vibration device is provided for removing the lead strip. In some embodiments, the device additionally comprises a vacuum device comprises a vacuum belt. The vacuum belt features a hole pattern that is adapted to the grid structure of the lead grid strip. In some embodiments, a hammer device is provided in the area of the removal point, which applies hammer blows to the casting drum at a predetermined frequency. In some embodiments, a guide plate is provided above the removed lead grid strip at the vertex point, which supports demolding. In some embodiments, the lead grid strip is moving throw a pair of a sand lapping jets located and working against each other. The draft angle can be less than 3 degrees.

DETAILED DESCRIPTION

It can thus be summarized significant advantages for the continuous casting process result from the absence of punching returns and thus, as described above, corrosion-promoting lead oxides, as well as the lower Ohm resistance achieved by thicker flags and the high casting speed, regardless of the alloy. In contrast, the draft angle of the grid bars is particularly disadvantageous.

A solution to avoid the asymmetric grid of the continuous casting process was surprisingly found by employing some physical processes. The prior art engineering realization is based on the unwinding of gears and timing belts, which require draft angles, covered in textbooks.

Figure 1:
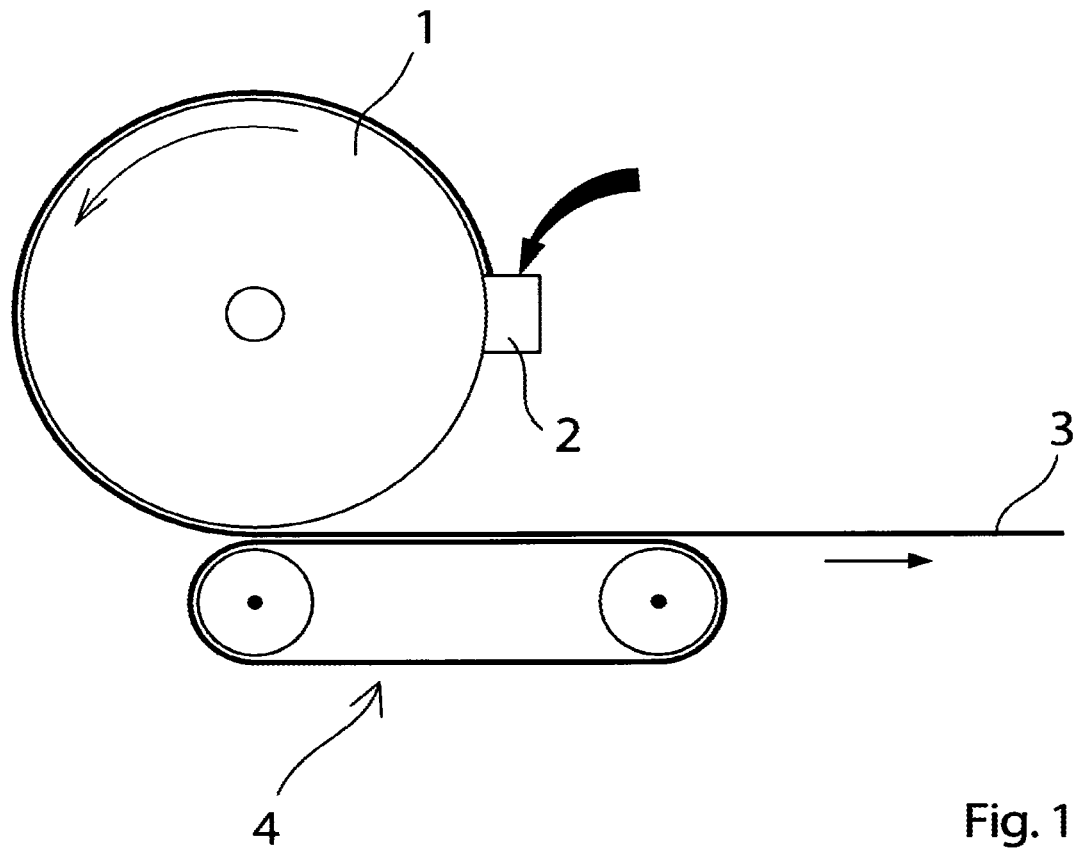
FIG. 1 shows the machine described in lateral view.
Figure 2:
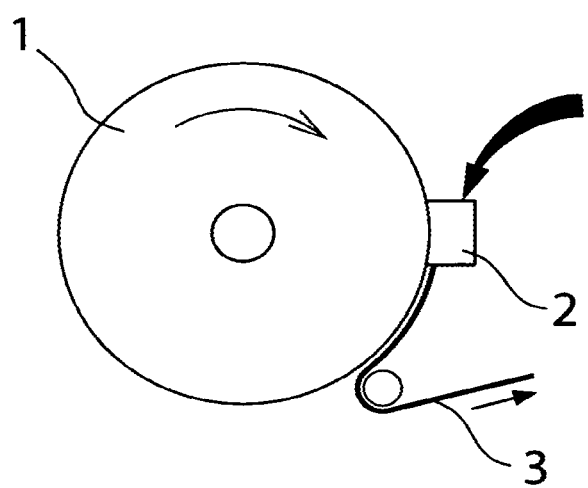
FIG. 2 shows typical commercial machines for continuous casting of lead grids for lead-acid battery electrodes.

By changing the running direction of today's commercial systems in accordance with FIG. 1 and an increase in the drum radius, demolding can take place with a small draft angle of less than 7 degrees. It is advantageous to use drums with a radius that is greater than 1 m, preferably greater than 1.2 m, as a result of which demolding becomes easier. In the illustrated arrangement of the casting shoe at the lower vertex, only one force component acts on the lead grid belt in the direction of gravity, after approximately 270 degrees. Thus, any weight force components that are perpendicular to the gravitational force at the lower apex will be eliminated so that the grid would fall from the engraved mold by the action of gravity, if no adhesion forces remained from the lubricant, which must be applied to the casting drum to reduce the friction between the casting shoe and the casting drum. Thus, apart from the adhesion forces resulting from the separating agent, the grid falls from the drum at a very low draft angle of less than 5 degrees, usually 3 degrees, as a result of which the bars exhibit a nearly ideal rectangular cross-sectional area.

To help overcome the low adhesion forces, hot compressed air can be blown into the gap between the drum and grid, or the cast lead grid band can be suctioned by means of a parallel-running vacuum belt. A knocking device or vibration device is also suitable for overcoming the adhesion forces. Furthermore, it is proposed to introduce a separating mold coating in the engraving of the casting drum. The openings of the vacuum band are adapted to the contour of the lead grid band, whereby an effective frictional connection takes place, which pulls the lead grid tape from the engraved grid shape.

A grid with such a small draft angle can be considered a rectangularly symmetrical, analog punched grid. The grids produced in continuous casting in this manner are sufficiently symmetrical and do not tend to bend during normal operation in the battery, provided that the active mass is equally applied to the bottom and top of the grid.

Continuous casting machines also avoid punched parts, which have to be cleaned from lead oxides in an alloying process. The cost of the additional alloying step is at least 10% of the price of the procured lead.

If the alloying process is omitted, the corrosion resistance of the grids in the batteries is reduced.

The device is particularly well-suited for the manufacture of lead-electrode grids with low alloy contents as well as for pure lead-tin alloys. These alloys are particularly suitable for AGM batteries as well as hybrid applications in the automotive field. Calcium or strontium alloys are used as alloy components for strengthening the grid. Both alloys result in increased corrosion. Antimony, which was used in the past, leads to high water consumption and cannot be used for maintenance-free batteries. Pure lead-tin alloys have proven to be particularly corrosion-resistant and have extremely low water consumption. Furthermore, the soft lead grid technology prevents force effects and damage to the separators, especially of glass fleece separators, such as those used in AGM batteries.

Subsequent sandblasting can on one hand roughen the surface of the lead strip and on the other hand remove any remaining release agents. Thus the surface is increased by sandblasting, which leads to a better mass grid adhesion and consequently improved current dissipation.

The system will be described in more detail below with reference to a schematic drawing.

FIG. 1 shows a drum 1, the surface of which has been engraved with the shape of the lead strip 3 to be cast. A so-called casting shoe 2 rests on the outer circumference of the drum, in the area of the horizontal drawn through its axis of rotation. In the present case, the shoe 2 is arranged on the right side of the drum, which rotates counterclockwise. The liquid lead exiting the casting shoe 2 runs into the concave mold in the drum surface. After three quarters of a rotation, the solidified lead strip is removed with the vacuum belt 4. The vacuum belt helps to overcome adhesion forces where necessary present.

The invention claimed is:
1. A method for casting electrode carriers for production of lead grid electrodes in a continuous casting process, comprising:
(a) providing a casting drum having a surface engraving, the engraving having a trapezoidal cross-sectional shape having a draft angle of 3 to 7 degrees;
(b) supplying a liquid lead into the casting drum surface from a casting shoe positioned next to an outer circumference of the casting drum, wherein the liquid lead is supplied during rotation of the casting drum;
(c) allowing the liquid lead to solidify into a lead grid strip on the casting drum, wherein the casting drum allows the liquid lead to solidify before less than one rotation of the casting drum from the position of the casting shoe; and (d) releasing the solidified lead grid strip only at a lower vertex of the casting drum after after about a three quarter turn of the casting drum, wherein the releasing of the solidified lead grid strip from the casting drum is caused by a means consisting of the force of gravity acting perpendicular on the solidified lead grid strip.

2. The method of claim 1, wherein the casting drum has a radius greater than 1 m.

* * * * *